INVENTOR.
WESLEY S. LARSON
BY
ATTORNEY

INVENTOR.
WESLEY S. LARSON
BY Donald R. Motsky
ATTORNEY

INVENTOR.
WESLEY S. LARSON
BY
ATTORNEY

United States Patent Office 3,492,387
Patented Jan. 27, 1970

3,492,387
PLASTIC ARTICLE MAKING
Wesley S. Larson, Hazardville, Conn., assignor, by mesne assignments, to Plastic Ammunition Products, Inc., Abingdon, Va., a corporation of Virginia
Continuation of application Ser. No. 506,361, Nov. 4, 1965, which is a division of application Ser. No. 144,919, Oct. 13, 1961, now Patent No. 3,377,951, dated Apr. 16, 1968. This application Sept. 27, 1968, Ser. No. 768,608
Int. Cl. B29d 23/02; B29c 17/07
U.S. Cl. 264—97                                   2 Claims

ABSTRACT OF THE DISCLOSURE

A method of fabricating a biaxially oriented one piece plastic article by drawing out a reservoir of material formed at one end of a cylindrical molded preform.

---

This application is a continuation of my U.S. application Ser. No. 506,361 filed Nov. 4, 1965 and now abandoned, which case is a division of my U.S. application Ser. No. 144,919, filed Oct. 13, 1961, now Patent No. 3,377,951, issued on Apr. 16, 1968.

This invention relates to the fabrication of strengthened thermoplastic articles in general and more specifically to making unevenly sectioned articles and hollow articles such as shotshells from suitable crystalline thermoplastic material by a novel process.

Hollow thermoplastic articles such as bottles and cups and many shell shaped plastic articles are usually made by injection molding the plastic material to shape while in the molten condition. This involves the disadvantage that the strength of materials is not fully realized with crystalline materials such as polyethylene, particularly that of the linear high density type. For example, a shot shell made by injection molding of such linear high density plastic does not have the highest strength attainable and need in the tubular side wall where the shell is relatively thin and subjected to the greatest stress. To realize more strength in the thin elongated tubular part of the shell, one approach has been to merely substitute an open ended tube of linear high density polyethylene for the conventional paper tube after the polymer has been oriented. This approach lacks the advantage of molding the shell case in one piece.

One object of this invention, therefore, is to provide seamless hollow bodies of plastic of improved strength.

Another object is the provision of a novel process for making plastic articles by combined molding and plastic deformation.

Another object is the fabrication of tubular vessels of a crystalline polymer of a suitable synthetic resin formed in novel apparatus in such a way that exceptionally high strength is developed in the tubular part of the article made integrally with the rest of the vessel.

Another object is to provide plastic articles having thin elongated sections of satisfactory formation and of improved strength by a combination of molding and after-working in a portion of the article.

Still another object is a novel combination of molding and solid plastic drawing or stretching to effect an improvement in the fabrication of articles from crystalline plastics.

A still further object is the provision of a novel process of making a seamless plastic ammunition case all in one piece.

Other objects and advantages will be evident from this description of the invention when taken together with the accompanying drawing wherein.

Figure 4:
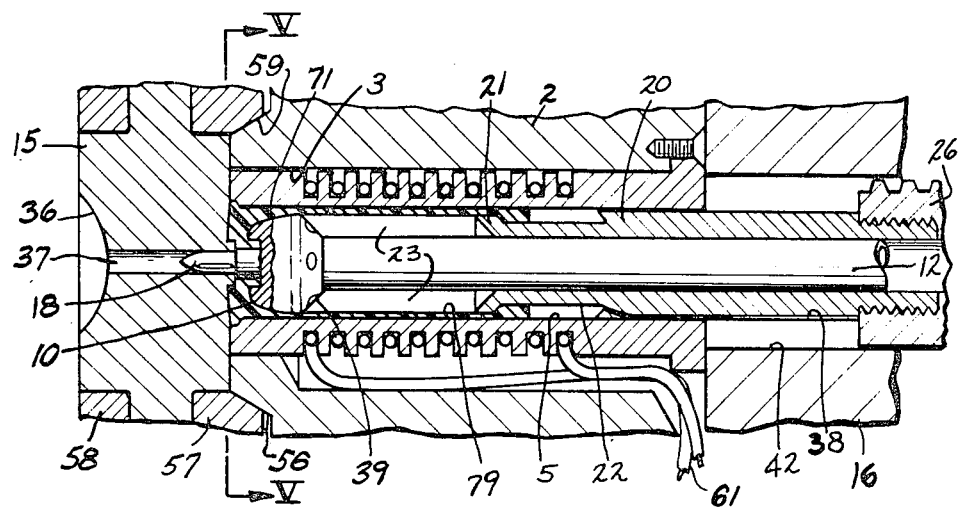
FIGURE 4 is a fragmentary view of part of the apparatus of FIGURE 1 in a further stage of operation upon the slug of FIGURE 2.
Figure 10:
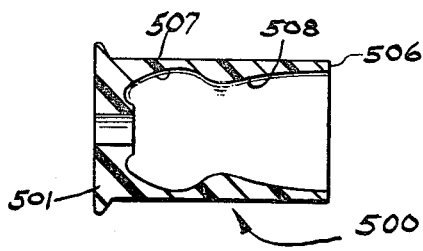
Figure 8:
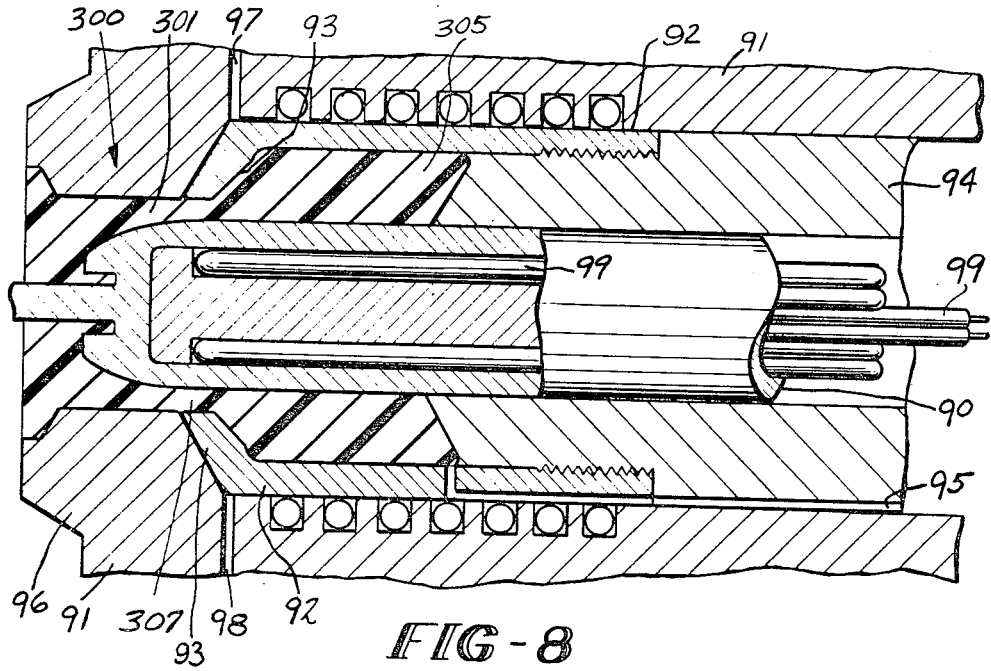
FIGURE 8 is an enlarged fragmentary elevational view partly in cross section showing another embodiment of the invention involving a modification of part of the apparatus of FIGURE 1 and showing another disposition of plastic in the slug.
Figure 9:
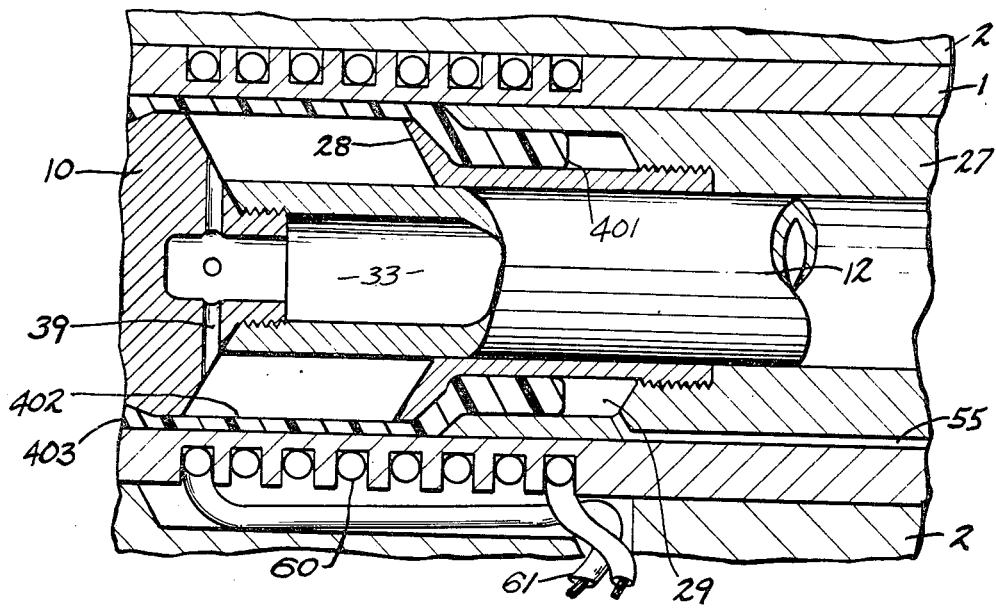

FIGURE 9 is also an enlarged fragmentary view comparable to FIGURE 8 showing a still further modification in the apparatus in a stage comparable to FIGURE 4 and showing still another disposition of plastic in the slug and deformation of part of the slug occurring in that stage; and FIGURE 10 is an enlarged cross sectional view showing still another form of slug where the plastic is disposed in the reservoir in a way for varying the after-working.

In accordance with this invention plastic material is first injection molded to a special shape of preform, herein called a slug, and then while it is in place in the same apparatus, part of the slug is subjected to an after-working. This involves deformation by drawing or stretching to increase the strength in this part by orientation while simultaneously reshaping the plastic to final finished shape and size in this part. Generally there is after-working or motion of a part of the injection molded slug while it is in the mold in which it is formed. The solidified or solidifying plastic material is plastically deformed while cooling to change its shaped to substantially final finished size while in the same cavity in which it is molded. The formed article is removed as a one-piece product of relatively complex shape having one part formed to shape by molding while another part of it is integrally molded therewith and reshaped by such stretching or drawing of plastic material while both parts remain in the integrated condition.

The manufacture of cup or shell shapes is contemplated, any shape having one relatively closed or headed end and the other an open end of a tube. A typical article is an ammunition case, a shotshell, for example.

In general, this invention involves provision of a tubular slug having opposing ends and an enlarged or thick beaded end portion next to a medial thin or undercut portion and using at least one of these ends as a reservoir out of which a finished relatively thin tubular wall is drawn as at least one of the end portions is pulled away from the other.

The deformation is applied in a part of generally tubular shape adapted for movement of the plastic material longitudinally in the axial direction from the molded reservoir portion. In this portion the material is simultaneously subject to either an inward or preferably an outward movement in the radial direction complementing the primary movement which is longitudinal or axial. The thick beaded end is thickened preferably radially inwardly so that drawing out provides the greatest circumferential orientation along with longitudinal increase in strength of the finished tube at least twice and preferably three times that of the molded plastic.

Drawing occurring from such an end portion involves preferably an increase in the median diameter, the more to increase the strength in the circumferential direction. When relaxation in this direction is permissable or desired, the beaded end of the slug is thickened radially outwardly to force the material to draw in while being drawn longitudinally as it is metered out of the reservoir. For an exceptionally long drawn tube part, outward disposition of the bead also enables the provision of more material in a short reservoir than the inward disposition with which a longer reservoir would be needed.

For the greatest reservoir, both outward and inward disposition of it may occur with suitable modification in the apparatus to provide a back-up sleeve or core as a replacement after either the outwardly disposed material is first metered away or the inwardly disposed material is first metered away, respectively. One disposition may be converted to another before final drawing occurs. For example, a relatively long but thin inward disposition, which is easier to bring or hold to a given temperature, may be drawn to form a short outward disposition. Then, after replacing the inner draw core with a back-up mandrel, the resulting outwardly disposed head may be drawn inward while the plastic material is elongated by stretch deformation to the final finished configuration of tube wall in the finished shell. What is meant by inward and by outward disposition of the reservoir is shown in FIGURES 1-4 and in FIGURE 8, respectively. A severe inward disposition is shown in FIGURE 9.

Molding occurs at suitable molten plastic temperatures and pressures for injection. For example, one type of high density linear polyethylene has been injected molded at a melt temperature of about 350° F. at a pressure of about 14,400 p.s.i. thereby filling the mold cavity in about 2 seconds to make a slug having a diameter, exclusive of its rim, of about 0.790 of an inch suitable for reshaping to a 12 gage shot shell case. After a holding period of about 4 seconds, the reservoir portion is then drawn from a thickness of about 0.077 of an inch on a side to about 0.022 of an inch at an axial speed requiring from as low as about 7 seconds per axial inch of draw to as high as about 14 seconds for a very slow draw where the solidifying plastic is held at the highest permissable temperature; and time must be given for cooling to draw temperature. The temperature and time of molding, cooling and deformation is adjusted for each configuration of article until the desired reshaping and super-orientation is achieved.

By this invention it has been found possible to produce articles such as shot shell cases from crystalline plastics such as from the linear high density polyethylenes and having a strengthened tubular body portion better resistant to shoot-offs and even to axial splitting because of the resulting super-orientation.

By super-orientation is meant an orientation increasing the strength by a factor of at least about two and preferably about three as compared to the strength of the plastic as molded before the after-working by drawing according to this invention.

This is done at a relatively wide range of temperatures below the crystalline melt temperature of the plastic and at speeds of deformation limited to prevent the plastic being heated to this temperature. During formation the temperature is maintained preferably at an elevated range. For the type of polyethylene contemplated the working temperatures are held well below the range from about 257° F. to about 265° F., and working occurs preferably from about 150–200° F. to slightly below about 265° F. for available grades and makes of the thermoplastic made by various methods such as the Zeigler process and the Phillips process, for example. For polypropylene the limiting temperature is somewhat higher and forming occurs below the much wider range from about 275° F. to about 330–335° F. Drawing of this plastic is contemplated at temperatures from about 200° F. to about 335° F.

The degree of crystallinity of the thermoplastic, as determined by various methods, such as the X-ray diffraction method, is preferably as high as possible; with polypropylene a high degree of isotacticity is also preferred.

At the crystalline melt temperature the polymer appears clear when viewed through crossed Nicol prisms in a hot-stage microscope, since all crystallinity of the structure is gone.

A fluid pressure hold-down action is preferably provided at a suitable temperature during all of the draw so that deformation occurs in a progressive manner in increments in a way maintaining the dimensions of the after-worked part of the articles to desired size. For example, by applying the fluid pressure internally, after-working is confined to the increment to deform it not only to substantially final thickness but also final outside diameter with accuracy and with equality to the outside diameter of the base portion of the shell case.

When the thinning action occurs from an outer reservoir as in FIGURE 8 and thinning is controlled to leave a slight excess in outer diameter, taking into account the inward displacement occurring from incremental "necking," then the fluid pressure may be applied externally as shown in FIGURE 8 to maintain not only a progressive draw but also the desired outside diameter which must be that of the gage of shell made by sizing on pin 90 to inside diameter.

By progressive drawing under the fluid holding action, after-working does not appreciably include the increments already deformed so that substantially no further necking occurs in them during drawing.

Gas such as warm nitrogen under a pressure of about 250 p.s.i has been successfully used for the purpose. The temperature of the hold-down fluid may be varied so long as the desired temperature of the plastic in the apparatus is not disrupted undesirably.

The fluid used acts on one side of the deformed and accumulated increments so as to press the plastic against a frictionally retentive surface. Hold-down action, therefore, is also affected by the condition of this surface of the mold cavity opposite the side to which the fluid is applied. This surface may be roughened by etching or sand blasting sufficient to increase the hold for the highest degree of after-working contemplated but not so excessive as to create stress risers in the surface of the plastic article. In this way uncontrolled stretching is avoided.

By selection of the shape and bulk of plastic in the reservoir bead of the slug to a desired degree of pre-thickening and foreshortening by a factor of at least 2—3, the corresponding portion of the finished article is strengthened while being elongated to final length.

Figure 1:
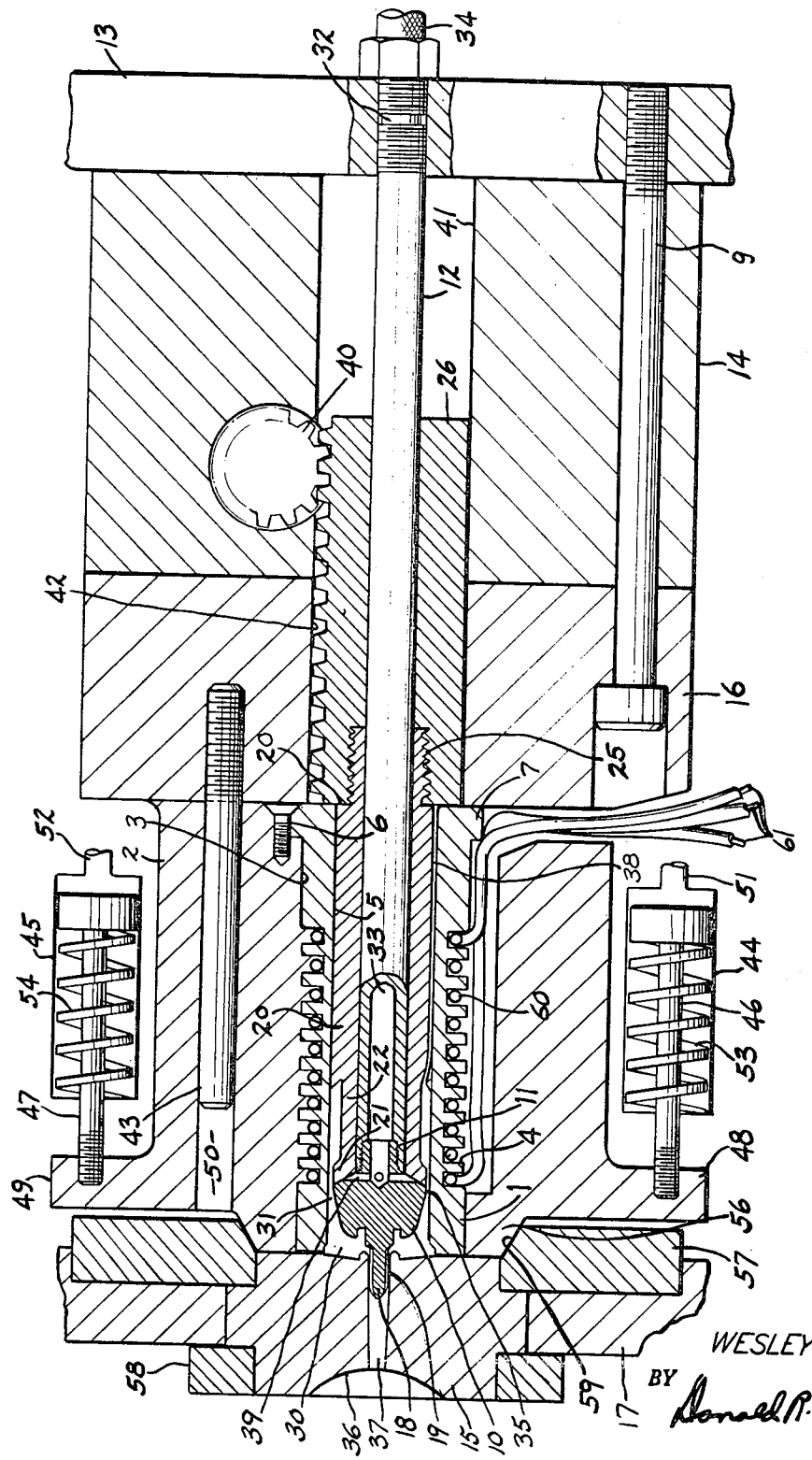
FIGURE 1 is a side elevational view in cross section showing a preferred embodiment of the apparatus devised for practice of this invention.

In the apparatus shown in FIGURE 1, for manufacture of shot shell cases, a tubular mold 1 of the center gated type is mounted in retainer plate 2 of a press in the receiver bore 3 thereof and cooperates with the mold core tip 10, the sprue bushing 15, and the retractible sleeve 20 to define a molding cavity 30 within the bore 5, of the mold. In the position shown, the cavity is adapted to receive plastic from a cylinder nozzle put into the nozzle seat 36 in bushing 15. The cavity is filled through sprue 37 and after a holding time of a few seconds, the nozzle may be withdrawn leaving a slug 70 shown separately for clarity in FIGURE 2.

Slidably mounted between rod 12 and mold 1 is draw sleeve 20 for reciprocating movement imparted by the draw rack 25 threadedly coupled at 26 to one end of the sleeve. The hollow rack threaded on rod 10 is motivated from a suitable source of power through pinion 40 carried in the drive block 14 and is mounted for reciprocation in bore 41 of the drive block 14 and in the bore extension 42 of mold frame block 16 which is mounted together with drive block 14 on the mold base plate 13 by any suitable means such as a number of cap screws, one of which is shown at 59. Rod 10 is also fixed on base plate 13.

Frame block 16 is provided with a number of guide posts such as 43 received in guide openings 50 in plate 2 for movably mounting the retainer plate 2 for intermittent reciprocating movement between a position in abutment with the frame block 16 (FIGURE 1) to a position away from the same block for extraction (FIGURE 6) of the finished case 100 from the mold 1, fitted with zone band heaters 60 controlled through leads 61 to prevent uneven excessive cooling of the plastic.

Retainer plate 2 is moved back and forth by any suitable means such as the pair of air cylinders 44 and 45 mounted on the press and shown semi-diagrammatically with their pistons connected to the retainer plate drive rods 46 and 47, respectively, which are attached to the plate at the extensions 48 and 49 respectively. Plate 2 and inserted mold 1 are yieldably held against mold frame block 16 by any suitable means such as by return springs 53 and 54 of the cylinders, but are clamped during molding between the press plates 13 and 17 acting through bushing 15 and frame 16. Mold 1 is held in plate 2 by screw 6.

The end of retainer plate 2 opposite block 16 is provided with the conical extension 56 forming a male guiding and centering means for coaction with the locating ring 57 of the sprue bushing 15, which with ring 57 is fixed on plate 17 by locking ring 58.

Figure 5:
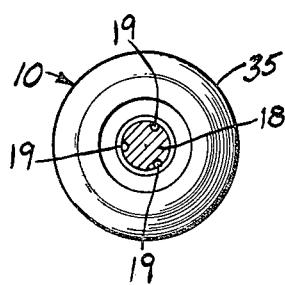
FIGURE 5 is an enlarged end view of the core tip of the apparatus of FIGURES 1 and 4 taken on line V—V of FIGURE 4, omitting the plastic.

When this bushing, mounted on the mold clamping plate 17 of the press is moved together with the locating ring 57 against mold 1, the mating concavity of locating ring 59 puts sprue 37 in concentric relationship with the mold cavity 30 and the guide pin 18 forming an extension of core tip 19, the latter of which forms with rod 12 and sleeve 20 the three pieces of the core of the mold. As it is pointed, pin 18 extending into sprue orifice 37 as shown in FIGURE 1 forms a centering and supporting bearing. It is provided with a number of longitudinal grooves 19 uniformly distributed around it (FIGURES 1 and 5) which form the center gate for admission of the plastic from the sprue 37 during injection molding when the mold 37 is clamped between sprue bushing 15 and frame block 16 by the action occurring when mold plates 13 and 17 are pressed toward each other.

Sleeve 20 at is inner end has a metering or doctoring lip 21 shaped to form fit the back side of tip 10.

In molding cavity 30, the circumferential periphery 35 of tip 10 forms a restriction 31 together with the lip 21 which extends at an angle from the reduced end portion 22 of the draw sleeve 20. When the tip 10 and lip 21 are in abutment (FIGURE 1) the far end of the cavity opposite sprue 37 is formed between sleeve reduction 22 and the adjacent interior surface of mold 1 as a voluminous cavity area into which there is injected a beaded reservoir part 75 of the plastic slug 70 formed as a first step in the apparatus and process of this invention.

During molding and drawing bushing 15 substantially closes one end of the cavity in sleeve bore 5 which is closed at the other end by sleeve 20. Remaining fixed in the cavity is core tip 10 mounted at threads 11 to a hollow support rod 12 fixed threadedly at the opposite end to a mold base plate 13 at perforation 32. Rod 12 has a passage 33 to which fluid is admitted by inlet 34 by way of the perforation 32 at which rod 12 and inlet 34 are inter-connected. Core tip 10 has fluid outlet vents 39 communicating at one end to passage 33 and at the other end with the inclined back side of the tip next to sleeve lip 21 movable alternately away from and toward the vents. Opposite the lip, sleeve 20 has a threaded coupling 25 for connection with the draw rack 26 motivated by pinion 40 driven by any suitable means and mounted in drive block 14.

Figure 3:
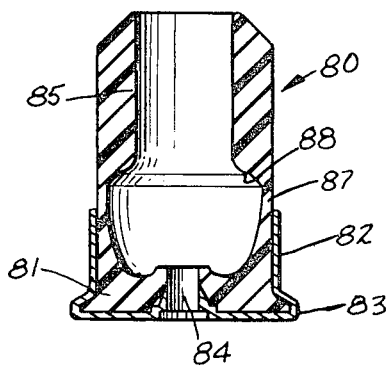
FIGURE 3 is an enlarged cross sectional view in elevation showing another form of slug at the intermediate stage.

As shown in FIGURE 3, the molding step may be modified by the insertion first of a metal piece into cavity 30 to form another cup-shaped preliminary shape or slug 80 whose base 81 is encased in the inserted cup-shaped metal piece 82 having a rim 83 and a primer opening 84. Portion 81 is injection molded with insert 82 to substantially final finished shape and gage together with the thick reservoir head 85 with thin medial section 87 between them to form the under cut 88 at which reshaping of portion 85 begins.

Figure 2:
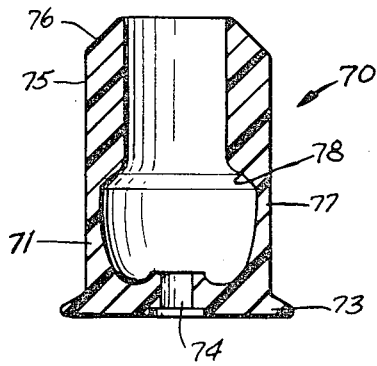
FIGURE 2 is an enlarged cross sectional view in elevation of one plastic slug as molded in place at an intermediate stage of the process performed in the apparatus of FIGURE 1.

The next step of drawing of the slugs is done as shown in FIGURE 4. For example, slug 70, of the shape shown in FIGURE 2, is adapted for formation of the tube wall of a shot shell case by after-working as shown. For this purpose, one end 75 beveled at 76 provides a reservoir while the other end 71 is characterized by the presence of an extraction rim 73 and a primer opening 74 making a substantially finished configuration of the head or base end of the shell by injection molding. The end 75 is a thick bead of plastic as compared to the finished thickness occurring at the short, thin medial portion 77 of the slug at which bead 75 forms an undercut 78 against which lip 21 acts in the next step which is that of drawing affected by retraction of the sleeve 20 as shown in FIGURE 4 almost to completion. Retraction occurs in the presence of fluid pressure admitted at vents 39 into the fluid chest 23 to hold the already drawn part 72 to the desired outside diameter and in axial retention pressed against the internal surface of the bore 5 of the mold 1. In the stage shown in FIGURE 4, a residual part 79 of the plastic reservoir remains for continued after-working to make the shell wall to a predetermined final finished length, thickness and gage.

Figure 6:
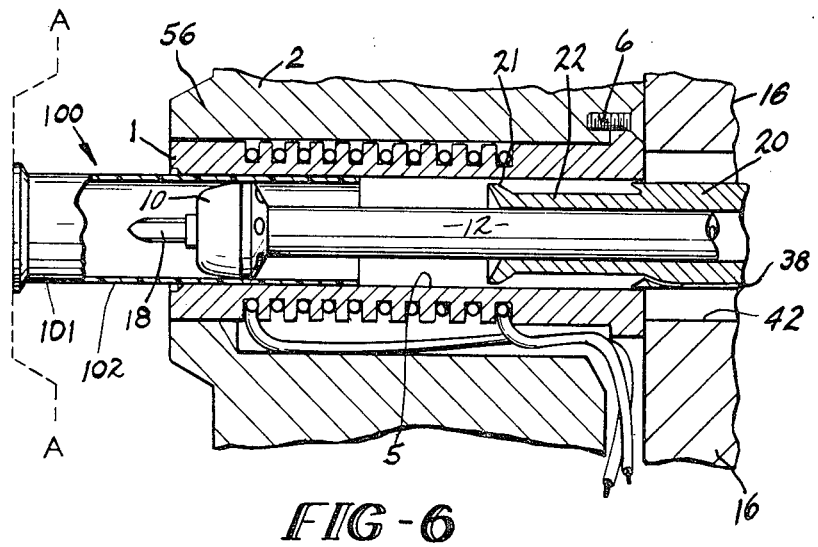
FIGURE 6 is a view comparable to FIGURE 4 but at a still further stage where the process is completed and the shell casing is shown being ejected.

Upon completion of the draw the finished shell 100, shown in FIGURE 6 being pulled from core tip 10 and its pin 18, is ejected out of mold cavity bore 5 in this way by the extraction thrust of retainer plate 2 moved to position A—A by rods 46 and 47 (FIGURE 1) when hydraulic or pneumatic fluid is applied under pressure at connections 51 and 52 of the cylinders 44 and 45. Plate 2 is shown returned under the action of springs 53 and 54.

The finished shell has a base 101 substantially identical to part 71 of slug 70 while the thin elongated shell wall 102 corresponds to part 75 of the slug.

Figure 7:
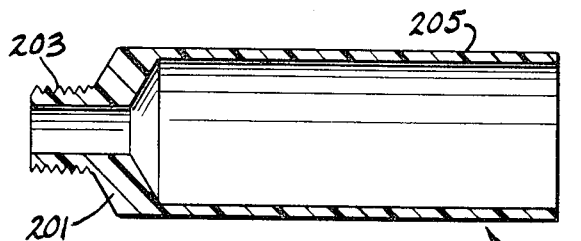
FIGURE 7 is a side elevational view in cross section showing another type of tubular article which is adapted to be made according to this invention.

Articles other than shells may be made in this way. For example, squeeze tube 200 may be made as shown in FIGURE 7, having a base 201 and threaded nozzle molded to shape different from but corresponding part 71 of the shell slug and also having a thin tubular wall 205 drawn out of the rest of the slug to obtain strengthening of the thin wall by super-orientation.

According to FIGURE 8 more plastic may be made available in a modified slug 300 for a longer draw from an outer reservoir 305 integrated with a base 301 at the thin medial portion 307. The base 301 is molded between a heated core pin 90 and the tubular mold 91. The bead 305 is mold between pin 90 and the cupped mold collar 92 having an inner inclined draw lip 93 forming a conical extension at one end of the collar the other end of which is attached to a reciprocatable draw sleeve 94 slidably mounted over core pin 90 between it and mold 1. Lip 93 extends in the mold to form medial portion 307 of the slug during injection molding and the lip mates with locating end 96 of the mold at the fluid pressure inlets 97 and 98. These correspond to inlets 39 of FIGURE 1 and for the same purpose, but serve for holding the drawn tube wall inwardly against core pin 90 which is provided with a heat exchange coil 99.

In the arrangement of FIGURE 9 shown in an intermediate stage of draw, the plastic reservoir, of which a residue is shown at 401, is disposed inwardly beyond all of the relatively thin drawn portion 402 so that it must be displaced outwardly during drawing beyond all of the relative thick bead 401. This, like the arrangement of FIGURE 1 provides circumferential as well as longitudinal plastic deformation from the reservoir portion of the plastic slug integrated with the base end 403.

Contrary to the arrangement of FIGURE 8, where circumferential stretch is minimized, FIGURE 9 provides the greatest stretch. By resort to these arrangements, it is possible to obtain desired variation in the ratio and quality of axial and circumferential orientation in the reshaped part of the finished article.

In FIGURE 9 the apparatus is very much like that of FIGURE 1, being changed to include a different draw sleeve 27 having a draw lip 28, terminating a hollow end portion 29 for formation of the plastic reservoir part 401 of a slug being drawn as shown. Otherwise, the same type of mold 1, retainer plate 2, core tip 10 orificed at 39, and support rod 12 with passage 33 are included.

Each form of the injection molding apparatus employed is vented to prevent entrapment of air and occurrence of undesired voids. For example, in the apparatus of FIGURES 1 and 4–6, the cavity is vented at groove 38 on a side of sleeve 20. In FIGURE 8, venting occurs at 95. In FIGURE 9, venting occurs at 55.

To obtain desired variation in orientation and resultant strength along the length of the reshaped part of the finished article, the slub reservoir portion may be made of non-uniform thickness.

As shown in FIGURE 10, slug 500, having the same shell base 501 at one end is provided with a bead 505 of variable radial thickness on the other side of the thin medial portion 507. The thickest part 508 next to 507 is designed to give the most super-orientation while the thin part 506 at the end gives the least, leaving the end very pliant for shell closure by crimping or the like. With the thin part 506 undergoing no drawing the resultant open end of the shell case is least likely to need trimming to a straight edge.

In all instances, the thin portion of the shell is drawn to sufficient length and improved strength to provide a terminal part adapted to be trimmed, if necessary, and turned in to form a folded evanescent and closure to which the plastic tubed shell is especially adapted in combination with a skirted overpowder wad arrangement disposed in the fully loaded shell between the powder charge and the shot as taught in U.S. Patent No. 2,582,125 granted to R. S. Holmes. The tubular portion of the plastic shell structure is resistant to "shootoff," i.e. severing of at least a portion of the front part of the shell from the rimmed head portion or the rest of the tubular portion.

By this invention, shell 100 is made of plastic such as of linear high density polyethylene or of polypropylene preferably of highly isotactic character, or the like polyolefin or similarly crystalline plastic susceptible of shaping by molding and deformation to final finished configuration not only of the base, but also of the tubular side wall all in one piece.

What is claimed is:

1. A method of forming a one piece plastic article having a closed end and a side wall of substantially increased tensile strength from a molded blank, comprising the steps of:
    (a) molding a preformed slug of crystalline plastic material having a generally cylindrical configuration including a substantially closed head portion;
    (b) forming a radially enlarged portion on said slug, said beaded portion being spaced longitudinally from said head portion;
    (c) forming a relatively thin walled portion on said slug between said head portion and said beaded portion;
    (d) maintaining the temperature of said slug below the crystalline melt temperature of the plastic material;
    (e) radially confining said slug internally and externally at least in part by means of a frictionally retentive surface;
    (f) longitudinally drawing said beaded portion relative to said head portion, while maintaining said frictionally retentive surface in confining position with respect to said slug, to effect an elongation and thinning of said beaded portion into a thin walled tubular segment having a longitudinal and circumferential tensile strength substantially greater than the tensile strength of said beaded portion; and
    (g) forming a sealed cavity adjacent to said thin walled tubular segment during said drawing step; and
    (h) introducing a pressurized fluid into said cavity during said drawing step to press said thin walled segment against said frictionally retentive surface.

2. The method of claim 1, wherein the drawing step is performed by moving said beaded portion away from said head portion at a rate ranging from 1 axial inch per 14 seconds to 1 axial inch per 7 seconds.

References Cited

UNITED STATES PATENTS

| | | | |
|---|---|---|---|
| 2,706,308 | 4/1955 | Lorenz | 264—97 |
| 2,854,694 | 10/1958 | Mumford | 264—94 |
| 2,878,513 | 3/1959 | Slaughter | 264—94 |
| 3,103,170 | 9/1963 | Covington et al. | |

ROBERT F. WHITE, Primary Examiner.

T. J. CARVIS, Assistant Examiner.

U.S. Cl. X.R.

264—292, 296, 323